US008797547B2

(12) United States Patent
Aeppli et al.

(10) Patent No.: US 8,797,547 B2
(45) Date of Patent: Aug. 5, 2014

(54) APPARATUS AND METHOD FOR MEASURING DEFORMATION OF A CANTILEVER USING INTERFEROMETRY

(75) Inventors: Gabriel Aeppli, London (GB); Benjamin Dueck, London (GB)

(73) Assignee: UCL Business plc, London (GB)

(*) Notice: Subject to any disclaimer, the term of this patent is extended or adjusted under 35 U.S.C. 154(b) by 844 days.

(21) Appl. No.: 12/596,596

(22) PCT Filed: Apr. 17, 2008

(86) PCT No.: PCT/GB2008/001375
§ 371 (c)(1),
(2), (4) Date: Jan. 15, 2010

(87) PCT Pub. No.: WO2008/129272
PCT Pub. Date: Oct. 30, 2008

(65) Prior Publication Data
US 2010/0149545 A1    Jun. 17, 2010

(30) Foreign Application Priority Data
Apr. 18, 2007 (GB) .................................. 0707470.1

(51) Int. Cl.
*G01B 11/02* (2006.01)
(52) U.S. Cl.
USPC ........................................................ 356/501
(58) Field of Classification Search
USPC ................................................ 356/498, 501
See application file for complete search history.

(56) References Cited

U.S. PATENT DOCUMENTS

| 5,103,174 | A | 4/1992 | Wandass et al. |
| 5,908,981 | A * | 6/1999 | Atalar et al. ..................... 73/105 |
| 6,075,585 | A | 6/2000 | Minne et al. |
| 6,196,061 | B1 | 3/2001 | Adderton et al. |
| 7,105,358 | B2 * | 9/2006 | Majumdar et al. ............ 436/518 |
| 2005/0117163 | A1 * | 6/2005 | Ng et al. ....................... 356/501 |

FOREIGN PATENT DOCUMENTS

EP    0706052    4/1996

OTHER PUBLICATIONS

International Search Report and Written Opinion issued in PCT/GB2008/001375 mailed Jun. 27, 2008.
Isaacs, et al., "Synchrotron X-Ray Microbeam Diagnostics of Combinatorial Synthesis", *Applied Physics Letters*, vol. 73, No. 13, pp. 1820-1822 (1998).
Tada, et al., "Novel Imaging System for Measuring Microscale Curvatures at High Temperatures", *Review of Scientific Instruments*, vol. 71, No. 1, pp. 161-167 (2000).
Jeon, et al., "Instant Curvature Measurement for Microcantilever Sensors", *Applied Physics Letters*, vol. 85, No. 6, pp. 1083-1084 (2004).
Mertens et al., "Real-Time Profile of Microcantilevers for Sensing Applications", *Applied Physics Letters*, vol. 87, 234102, 3 pp. (2005).

(Continued)

*Primary Examiner* — Jonathan Hansen
(74) *Attorney, Agent, or Firm* — Lempia Summerfield Katz LLC

(57) ABSTRACT

Apparatus and method for measuring the deformation of a tethered or untethered cantilever by projecting a radiation beam onto the cantilever, detecting an interference pattern reflected from or transmitted through the cantilever, and calculating the deformation of the cantilever by measuring the intensity variation within at least a portion of the interference pattern.

22 Claims, 5 Drawing Sheets

(56) References Cited

OTHER PUBLICATIONS

Yaralioglu et al., "Analysis and Design of an Interdigital Cantilever as a Displacement Sensor", *Journal of Applied Physics*, vol. 83, No. 12, pp. 7405-7415 (1998).
Helm, et al., "Read Out of Micromechanical Cantilever Sensors by Phase Shifting Interferometry", *Applied Physics Letters*, vol. 87, 064101, 3 pages (2005).

Manalis et al., Interdigital Cantilevers for Atomic Force Microscopy, Dec. 16, 1996, Applied Physics Letters; vol. 69, No. 25, pp. 3944-3946.
Sulchek et al., Parallel Atomic Force Microscopy with Optical Interferometric Detection, Mar. 19, 2001, Applied Physics Letters; vol. 78, No. 12, pp. 1787-1789.

* cited by examiner

PRIOR ART

APPARATUS AND METHOD FOR MEASURING DEFORMATION OF A CANTILEVER USING INTERFEROMETRY

RELATED APPLICATION DATA

This U.S. National Phase Application is based on and claims priority benefit of international application no. PCT/GB2008/001375 filed on 17 Apr. 2008, which claimed priority benefit of Great Britain national patent application no. 0707470.1, filed on 18 Apr. 2008.

BACKGROUND

1. Field of the Invention

The present invention relates to the problem of measuring the deformation of cantilevers, and in particular micro-cantilevers.

2. Description of the Related Art

The accurate measurement of cantilever deformation is a key issue in a number of different applications. For example, the atomic force microscope has for some time used deflection of a cantilever at the tip to measure the force between tip and sample.

More recently, arrays of cantilevers have been used as biosensors. It has been shown that when biochemically specific interactions occur between a ligand immobilized on one side of a cantilever and a receptor in solution, the cantilever bends due to a change in surface stress, which can be detected optically.

More generally, sensor arrays are very promising for application in disease diagnosis, drug screening, sensitive detection of very small concentrations of different substances, NOSE applications, fluid/gas flow, pressure sensors, and for temperature measurements. A nanomechanical actuation mechanism may be used, according to which cantilevers are microfabricated by standard low-cost silicon technology and, by virtue of the size achievable, are extremely sensitive to the presence of small molecule chemical and biological interactions, e.g. detecting femtomoles of biomolecules of DNA, and many other chemicals, including explosives.

The ability to detect multiple biomolecules has been limited to the number of fixed-end cantilevers that can be microfabricated. In addition, everyday clinical use has been challenging because the physical measurement apparatus could not be separated from the biochemical environment. Also, as in all fixed array-based combinatorial methods where scale-up is derived from increasing the number and density of elements in the array, chemical cross-contamination and physical cross-talk represent significant hurdles. These issues are discussed in E. D. Isaacs, M. Marcus, G. Aeppli, X. D. Xiang, X. D. Sun, P. Schultz, H. K. Kao, G. S. Cargill, and R. Haushalter, "Synchrotron x-ray microbeam diagnostics of combinatorial synthesis", Applied Physics Letters 73(13), 1820 (1998).

FIG. 1 illustrates a typical prior art optical detection method, which relies on shining a fixed laser onto the free end of a tethered cantilever. However, such methods provide no information about the profile of bending and have limited scalability for microarray technology.

A number of different methods have been published describing how to measure the profile of cantilevers.

Tada et al. (H. Tada, A. E. Kumpel, R. E. Lathrop, J. B. Slanina, P. Nieva, P. Zavracky, I. N. Miaoulis, and P. Y. Wong, "Novel imaging system for measuring microscale curvatures at high temperatures", Review of Scientific Instruments 71(1), 161 (2000)) disclose a method in which the deflection of a 100 μm cantilever is detected with a resolution of 1.5 μm.

Since deflections for cantilever biosensors are expected to be below 200 nm (based on a 500 micron long, 100 micron wide, 1 micron thick silicon cantilever with a spring constant of 0.02 N/m, which corresponds to a surface stress change of approximately 30 mN/m), the technique of Tada et al is not suitable for such applications.

S. Jeon and T. Thundat, "Instant curvature measurement for microcantilever sensors", Applied Physics Letters 85(6), 1083 (2004) discloses an approach using a multiple-point deflection technique, where eight light-emitting diodes are focused on various positions of a cantilever. The main drawbacks for this method are the difficulty of aligning the eight lasers as well as evaluating large number of cantilevers.

J. Mertens, M. Alvarez, and J. Tamayo, "Real-time profile of microcantilevers for sensing applications", Applied Physics Letters 87(23) (2005) discloses a technique in which the bending profile is acquired by optically rastering the cantilever. Drawbacks for this method are, first, the error introduced mechanically through the raster process and second, even more significant, the movement of the cantilever itself during the measurement.

Two methods have been published using optical interference.

Firstly, in the method disclosed in G. G. Yaralioglu, A. Atalar, S. R. Manalis, and C. F. Quate, "Analysis and design of an interdigital cantilever as a displacement sensor", Journal of Applied Physics 83(12), 7405 (1998), interdigitated cantilevers are used, which allow for detecting the deflection of the free end of the cantilever only.

Secondly, in the method disclosed in M. Helm, J. J. Servant, F. Saurenbach, and R. Berger, "Read-out of micromechanical cantilever sensors by phase shifting interferometry", Applied Physics Letters 87(6) (2005), the bending profile of the whole cantilever can be determined. However, the disclosed method relies on: a) the use of a point of reference on the cantilever support; and b) the interference of two beams, a reference beam and the reflected beam from the cantilever. The arrangement is complex and only applicable to tethered cantilevers.

SUMMARY

It is an aim of the present invention to overcome some of the above-mentioned problems with the prior art.

According to an aspect of the present invention, there is provided an apparatus for measuring deformation of a cantilever, comprising: a projection system for projecting a radiation beam onto a cantilever; and a measurement system for detecting radiation transmitted through or reflected from said cantilever, wherein said projection system is arranged such that the radiation transmitted through or reflected from said cantilever forms an interference pattern; said measurement system is configured to measure the spatial variation in intensity within at least a portion of said interference pattern; and said apparatus further comprises a deformation calculating system for calculating a deformation of said cantilever from the spatial variation in intensity measured by said measurement system.

According to an alternative aspect of the invention, there is provided a method of measuring deformation of a cantilever, comprising: projecting a radiation beam onto a cantilever; and detecting radiation transmitted through or reflected from said cantilever, wherein: said radiation beam is projected onto said cantilever in such a way as to form an interference pattern; and said method further comprises: measuring the spatial variation in intensity within at least a portion of said interference pattern; and calculating a deformation of said cantilever from the measured spatial variation in intensity.

In other words, information concerning the nature and/or extent of the cantilever deformation (for example, bending and/or other changes in shape—rather than orientation—of the cantilever) is extracted from a change in the structure or content of an interference pattern (i.e. a change in the spatial variation in intensity within the pattern) generated by interaction of an incident beam with the cantilever (e.g. reflection from, or transmission through, the cantilever). For example, changes in the shape of peaks and/or troughs in the interference pattern relative to the interference pattern for an undistorted cantilever are analysed to obtain information about the cantilever deformation.

This approach avoids the alignment problems intrinsic to prior art methods that monitor the deflection of the reflected or transmitted radiation. As a consequence, scaling up to deal with large numbers of cantilevers can be achieved more efficiently. Sensitivity sufficient for biosensing applications can also be achieved more easily.

The method can be implemented using only one laser beam reflected or transmitted from the cantilever. An additional reference beam is not necessary. Furthermore, a point of reference on a cantilever support is not necessary. The present arrangement can therefore be implemented more efficiently.

The problems of chemical cross-contamination and physical cross-talk mentioned above for fixed array-based combinatorial methods, where scale-up is derived from increasing the number and density of elements in the array, can be avoided by untethering the cantilevers from the substrate which anchors them in the traditional scheme, and measuring their deformation when they are free objects in solution, e.g. flowing through a microchannel or suspended in a static solution. The present arrangement is ideally suited to perform this measurement task. The profile of a free floating cantilever can be detected because the information about bending is completely contained in the change of its own interference pattern. The tilt (or change in orientation) of the free floating cantilever can simply be removed from the interference pattern by shifting the signal obtained with the measurement system (CCD).

Embodiments in which the interference pattern is formed by transmission through the cantilever offers particular advantages for confined microfluidic geometries, thus making everyday clinical use less challenging.

Furthermore, the method makes it possible to distinguish between tilting (change in orientation) and deformation (change in shape) of the cantilevers in a single step by deconvolving the interference pattern into these components.

The interference pattern may be formed from the whole of the cantilever. For example, where the cantilever has a broadly rectangular form (in a plane orthogonal to the incident radiation), the interference pattern may resemble a "single-slit" (sinc squared) diffraction pattern. Additionally or alternatively, a micropattern may be formed in the cantilevers and the measurement system may be configured to monitor the intensity variations in the interference pattern resulting from radiation reflected from or transmitted through the micropattern. In other words, the micropattern may be defined by regions of high relative reflectivity (where the pattern is to be produced by reflection) or by regions of high transmittance (where the pattern is to be produced by transmission). Regions of high transmittance may be produced by chemical etching or mechanical incisions, for example.

Because a micropattern yields a full diffraction pattern with as many numerical intensities as there are pixels in the detector, the deformation of the cantilever can, in principle, be determined with as great a resolution as performing angle of reflection measurements at a number of points on the cantilever similar to the number of aforementioned pixels. Another advantage of the interference method proposed here is that it will work with cantilevers which are largely transparent, or opaque and/or matte (not shiny)

The micropattern may comprise at least one of the following: a regular or irregular array of reflective or transmissive slits; a regular or irregular array of transmissive or reflective spots; a two dimensional array, and combinations thereof.

A two dimensional array is a micropattern which causes the diffraction pattern to have structure in two dimensions rather than just one dimension. This allows information about bending along different axes to be extracted simultaneously from a single interference pattern. Full cantilever curvature tensors and mean tilt can in principle be extracted from such patterns.

Identification information may be added to the micropattern to identify individual cantilevers. The identification information may be extracted from the interference pattern produced by the micropattern as part of the deformation calculating process, for example. Thus, the identity of individual cantilevers can be determined efficiently without additional hardware and/or without further method steps. The same interference pattern can be used both to determine cantilever deformation and to identify the cantilever. This may be particularly important where an array containing a large number of different cantilevers is being measured and/or where the cantilevers are not tethered to a substrate. For example, in a biosensing application, it may be desirable to screen for a large number of different substances simultaneously.

Various optical configurations are possible. One coherent beam or multiple coherent beams (for example, two, three or more) can be employed to illuminate the cantilever. The effect produced by using multiple coherent beams can be achieved also with a single coherent beam if the cantilever is patterned with a suitable reflective or transmissive diffraction grating.

The use of multiple beams (and/or multiple slits or reflecting elements in a micropattern) produces multiple peaks. This enhances the accuracy of the measurement since tracking multiple peaks at the same time instead of just one peak is better than performing multiple measurements one after another because of the possibility of motion of the cantilever between such measurements and the desire for fast readout.

As mentioned above, atomic force microscopes rely on monitoring the displacements of a cantilever attached to a tip. The bending of the cantilever is measured by detecting the displacement of a reflected laser spot. The interferometric methods proposed here, especially if a two-dimensional pattern is collected, will have many advantages over prior art methodologies. In particular, lateral forces can be inferred from the curvature tensor for the cantilever, and the vertical displacement of the tip can be determined more accurately by measuring the locations of the multiple interference fringes.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIG. 4A shows the case for a tethered cantilever and single incident beam, FIG. 4B shows the case for a rigid tethered cantilever (which can only tilt) and a single incident beam, FIG. 4C shows the case for an untethered cantilever and single beam, and FIGS. 4D and 4E show the situation for multiple incident beams (respectively, two and three)

DETAILED DESCRIPTION OF THE DISCLOSURE

Figure 1:
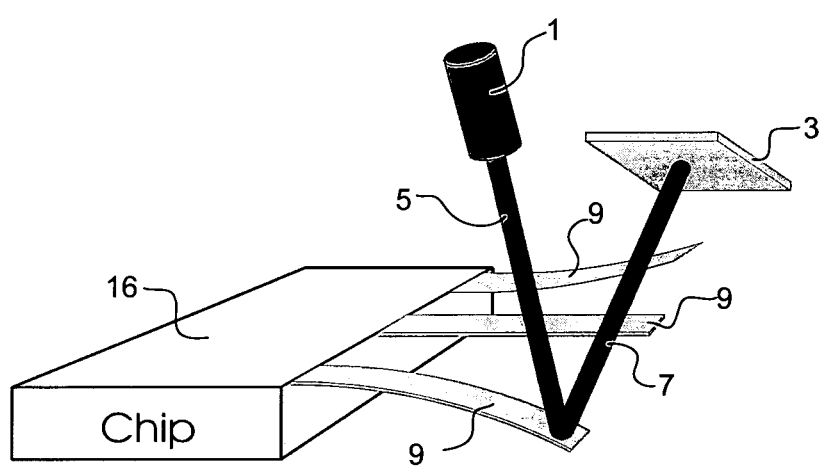
FIG. 1 is a schematic depiction of a prior art arrangement for measuring the tilt of a tethered cantilever.

FIG. 1 shows a prior art arrangement for determining the tilt of a tethered cantilever 9. The cantilevers 9 are fixed (tethered) at one end to a chip or substrate 16. A projection system 1 projects a laser beam 5 onto a localized spot on the cantilever 9. A detector 3 detects the reflected beam 7. The angle at which the reflected beam 7 leaves the cantilever 9 is a function of the amount of tilt of the cantilever 9. Measuring the position at which the reflected beam 7 is incident onto the detector can therefore determine the amount of tilt of the cantilever 9. This method depends on accurate alignment of the laser, chip and detector. The method cannot be applied where the cantilevers are untethered, e.g. floating in a static solution or carried in a flow.

Figure 2A:
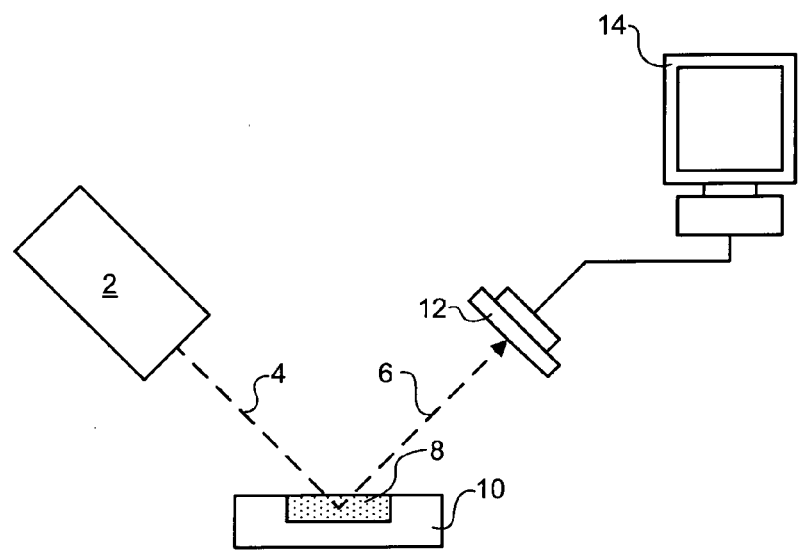
FIG. 2A is a schematic illustration of an embodiment of the present invention in which deformations of untethered cantilevers suspended in a static solution are measured.

FIG. 2A shows an apparatus for measuring deformation of a cantilever according to an embodiment of the invention. A projection system 2 is provided for projecting a beam of radiation onto a cantilever to be measured. According to the embodiment, the cantilever to be measured is suspended within a static fluid medium 8 contained in container 10. According to alternative embodiments, the cantilever to be measured may be suspended within a non-static or flowing fluid, in vacuum or in any other gas, including air. The cantilever may also be fixed at one end to a support (i.e. tethered).

Figure 2B:
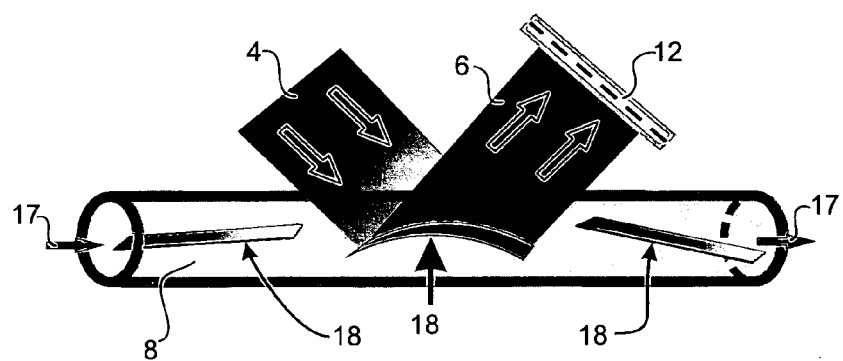
FIG. 2B is a magnified schematic view showing radiation incident on and reflected from cantilevers suspended in a flowing solution.

FIG. 2B shows a close-up view of a variation in which the cantilevers 18 are suspended in a moving fluid (depicted schematically by arrows 17) rather than a static fluid (as in FIG. 2A).

In both cases, the properties of the laser are such that a reflected beam 6 causes an interference pattern from the cantilever to be formed on a detection plane in a measurement system 12. The measurement system 12 is capable of measuring the spatial variation in intensity of the interference pattern. The measurement system 12 may be a charge-coupled device (CCD), for example.

The measurement system 12 is configured so that data can be transferred to a deformation calculating system 14, which is configured to calculate a deformation of the cantilever from the spatial variation in intensity measured in one or two dimensions by the measurement system 12. The deformation calculating system 14 may be implemented using a desktop computer or a dedicated integrated circuit, for example.

The deformation of the cantilever can be extracted from the measured intensity variations in the interference pattern by comparing the measured variations with variations predicted using numerical models and/or calibration measurements.

The results of some numerical studies are discussed further below. Examples of useful metrics for quantifying changes in the interference pattern are also discussed.

Figure 3:
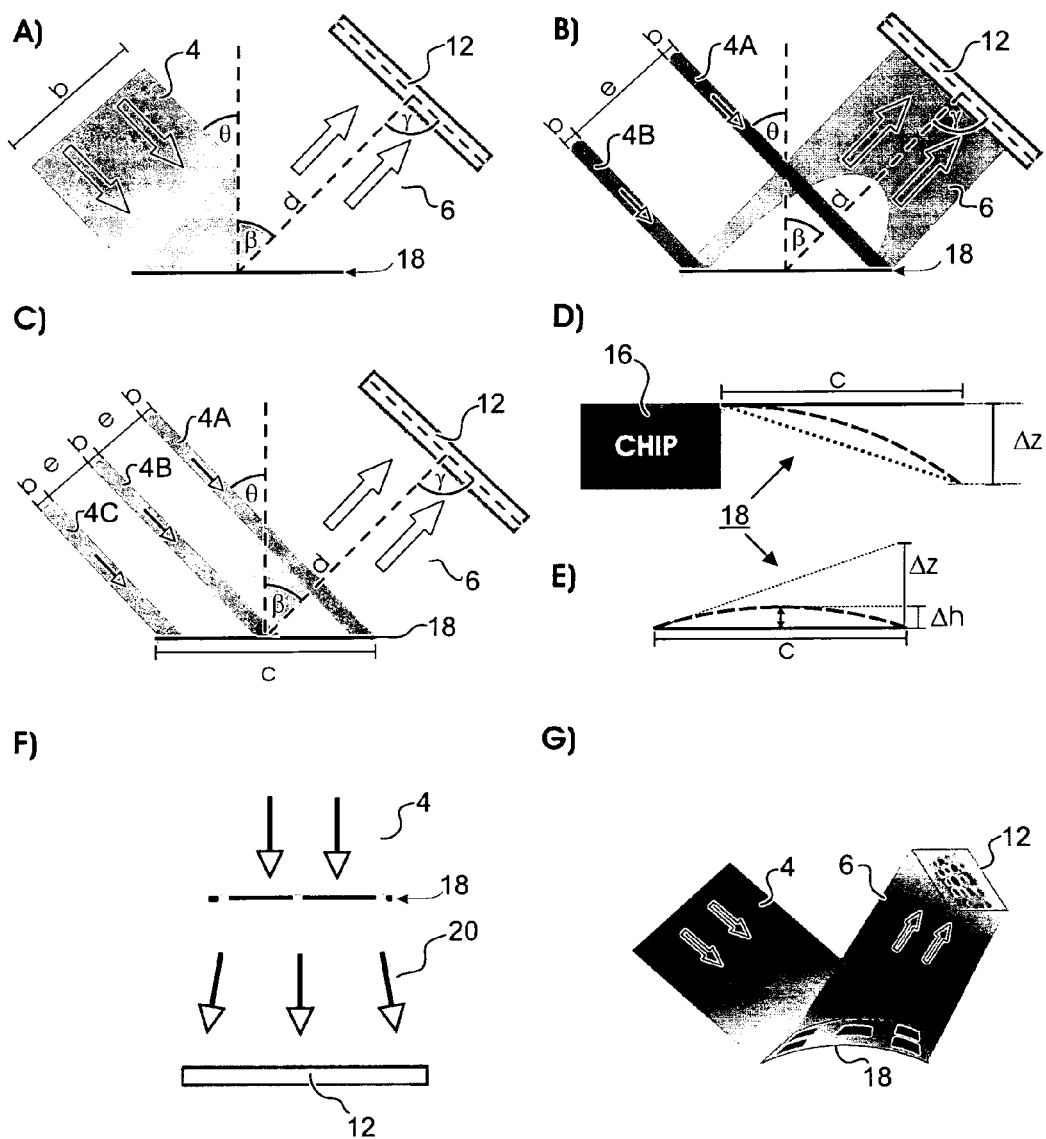
FIG. 3A to 3C show different optical geometries for the radiation projected onto the cantilevers.
FIGS. 3D and 3E compare bending and tilt of a tethered cantilever (FIG. 3D), and bending of an untethered cantilever (FIG. 3E)
FIG. 3F illustrates an embodiment in which the interference pattern is produced via transmission through a micropattern formed in the cantilever.
FIG. 3G illustrates the formation of a two-dimensional interference pattern from a two-dimensional micropattern formed on the cantilever.

FIG. 3A shows an arrangement in which the whole of a cantilever 18 is illuminated with a single coherent beam of radiation. In this case, the form of the interference pattern may be defined by the outline of the cantilever 18 (and its deformation). For the flat cantilever, the observed interference pattern is known in the literature as Fraunhofer interference. This arrangement has the advantage of being simple to implement and analyse. The form of the interference pattern, where the cantilever has an elongated rectangular profile, may resemble the sinc-squared pattern formed by diffraction from a single slit. See the discussion below regarding FIGS. 4A to 4C.

Alternatively or additionally, the projection system 2 may be configured to illuminate only a portion of the cantilever. For example, in the case where the cantilever has a strip-like form, the projection system may be configured to illuminate the cantilever over the whole of the width of the cantilever for at least a portion of the length of the cantilever. Information about bending of the cantilever about an axis perpendicular to the width may therefore be extracting in detail from the cantilever's interference pattern. In general, the cantilever can have an arbitrary shape, but it may be convenient from a manufacturing point of view to produce rectangular cantilevers. In this case, the width referred to above would correspond to the shortest dimension of the rectangle and the length to the longest dimension.

FIGS. 3B and 3C show arrangements in which the cantilever is illuminated respectively with two and three coherent laser beams. It is also possible to use even more beams. The coherent beams can be produced by beam splitters. The interference pattern from the reflection of multiple beams can as well be achieved by using the one beam illumination method (FIG. 3A) and micropattern the cantilever with a specific reflective pattern (diffraction grating).

Another implementation of interferometry to measure the bending of microcantilevers is the use of slits, produced e.g. by chemical etching or mechanical incisions, rather than reflecting surfaces, of the cantilevers and to view the associated interference patterns in transmission rather than reflection. FIG. 3F illustrates such an arrangement.

These diffraction gratings can also be used as a barcode to identify individual functionalised cantilevers. In this case, a cantilever identification device may be provided to analyse the interference pattern and extract the cantilever identity therefrom. The cantilever identification device functionality may be implemented in software on the desktop computer (e.g. 14 in FIG. 2A), for example. Alternatively or additionally, separate hardware for this process may be provided.

The pattern of beams and/or reflecting and/or transmitting areas on the cantilevers can be two-dimensional rather than one-dimensional, resulting in two-dimensional interference patterns from which mean tilt and full curvature tensors can be extracted. FIG. 3G illustrates the formation of such a two-dimensional interference pattern.

The proposed systems have been evaluated using numerical simulations. Without loss of generality the simulations have been performed for one-dimensional reflecting patterns, e.g. lines of shiny spots or bars on the cantilevers. For all simulations the following parameters were kept constant. FIGS. 3A, B, and C show the geometries and corresponding definitions of parameters. The wavelength was $\lambda=655$ nm and the CCD was mounted at a distance of d=4 cm. For simplicity but without loss of generality the angles were $\theta=\beta=0$ and $\gamma=\pi/2$. The cantilever length for all experiments was c=100 μm.

Figure 4:
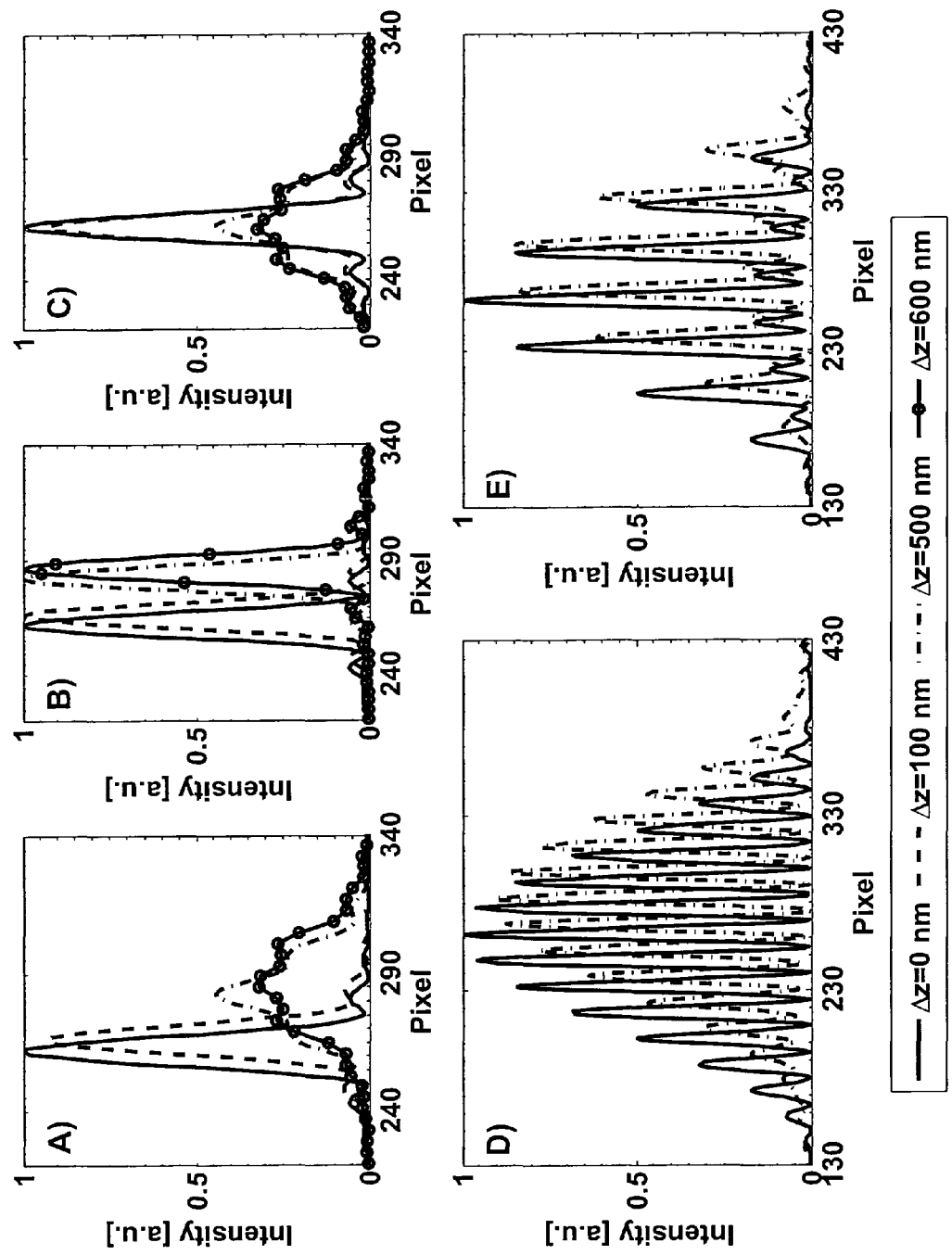
FIGS. 4A to 4E show the results of numerical calculations to predict interference patterns for different cantilever deformation magnitudes.

The results of the simulations are shown in FIG. 4, in which the five graphs each contain two or more curves representing interference patterns for different amounts of deformation $\Delta z$ (i.e. $\Delta z=0$ nm, 100 nm, 500 nm, and 600 nm; see legend).

The first simulation presents the case of a tethered cantilever (illustrated in FIG. 3D). The results (FIG. 4A) show that in addition to the displacement of the maximum, due to the tilt of the surface normal, there is a change of the peak shape due to the modified Fraunhofer interference pattern from the bending of the cantilever. Two further simulations have been performed to clarify this matter. In one case the cantilever consists of one rigid piece which is attached to a hinge on the chip which cannot bend but can just tilt (see dotted line in FIG. 3D). The recorded pattern (FIG. 4B) reveals that the entire Fraunhofer pattern is merely shifted. The other case is an untethered cantilever (illustrated in FIG. 3E) which just bends but does not tilt. The results (FIG. 4C) clearly indicate that only the shape of the interference pattern changes but the pattern does not shift for different $\Delta z$. (For small $\Delta z$ it can be derived that $\Delta z=4*\Delta h$.) This shows that the interference pattern can be deconvolved with one part attributed to the tilt of the cantilever while the other part represents the bending only.

The interference pattern for the configuration with two or three laser beams (FIGS. 4D and 4E) shows the comblike structure characteristic of multi-slit interferometers. As the cantilever bends, these structures change in easily measurable ways. Most notably, for the two beam/mirror/slit pattern, most of the nodes are lifted from the horizontal axis and assume a sinusoidal pattern (highlighted by the dashed line in FIG. 4D), while for the three beam/mirror/slit configuration, the apparent symmetry of the pattern changes (note the evolution from a single peak with maximum intensity to two peaks apparently attaining the maximum, as well as the outlaying peaks gaining intensity on the right hand side of the pattern). Additionally all peak shapes are subject to alteration in respect to $\Delta z$. This change is particularly enhanced at the outer peaks.

Again the tilt and the bending have been simulated separately for these optical configurations (FIGS. 3B and 3C) and confirm that the displacement of the peak can be attributed to the tilt and the change of the peak shape to the bending of the cantilever. The results are not shown here.

Figure 5:
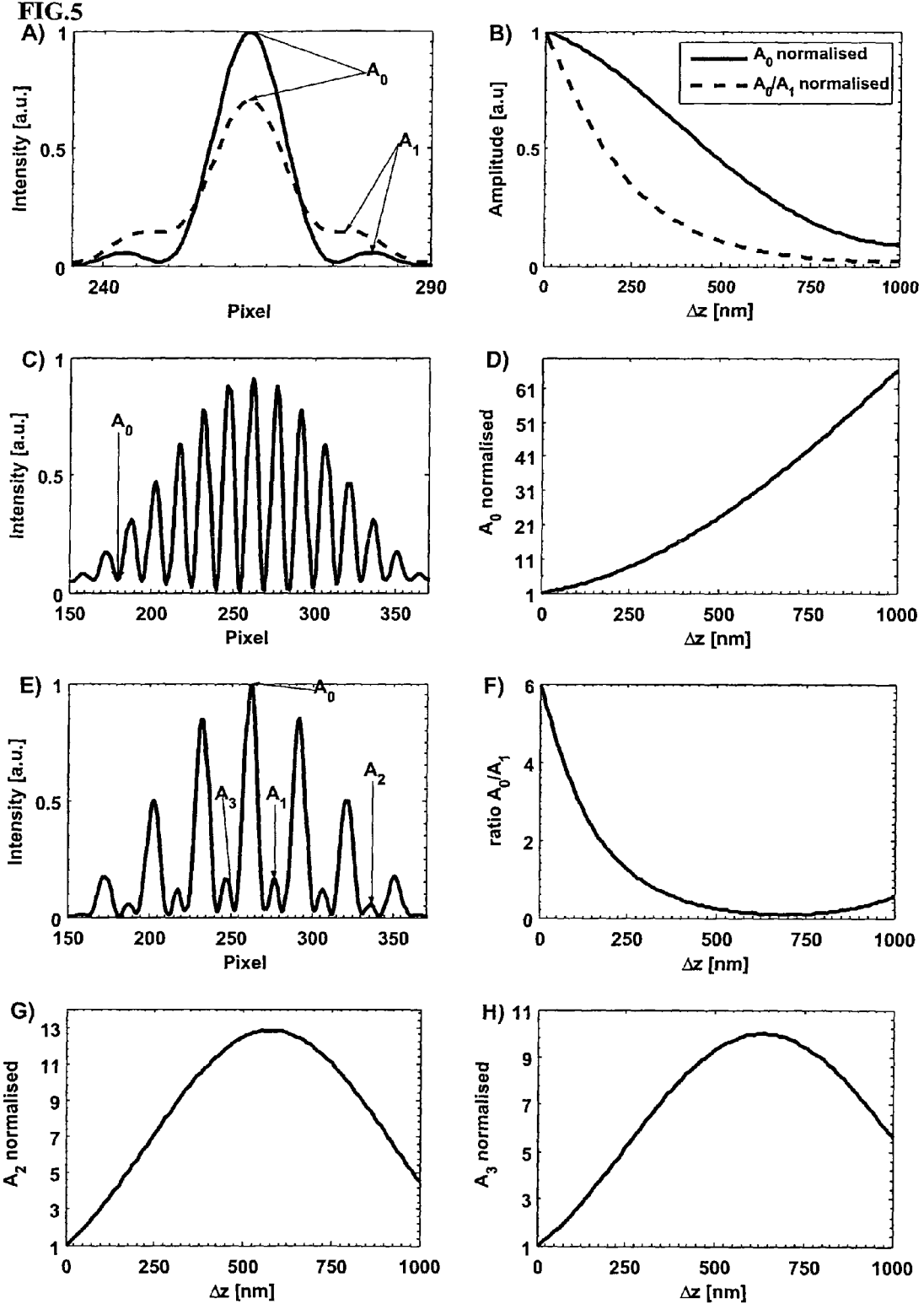
FIGS. 5A to 5H show the results of numerical calculations to predict interference patterns for various geometries of incident radiation and illustrates the use of different metrics to quantify changes in the structure of the interference patterns with deformation of the cantilever.

FIG. 5 shows the dependence of various metrics derivable from the interference patterns measured on the detector plane. All of the interference patterns shown (FIGS. 5A, 5C and 5E) result from the bending of the cantilever only, i.e. there is no average tilt. The situation corresponds to the geometry shown in FIG. 3E for an untethered cantilever.

FIG. 5A shows the interference pattern for reflection from a cantilever according to the optical geometry of FIG. 3A, for two different $\Delta z$. FIG. 5B shows the amplitudes $A_0$ (solid line) and $A_1$ (dashed line) of the primary and second peaks in intensity of the interference pattern of FIG. 5A as a function of $\Delta z$.

FIG. 5C shows the interference pattern for reflection from a cantilever according to the optical geometry of FIG. 3B. FIG. 5D shows the amplitude $A_0$ of the trough marked in FIG. 5C as a function of $\Delta z$.

FIG. 5E shows the interference pattern for reflection from a cantilever according to the optical geometry of FIG. 3C. FIG. 5F shows the ratio of the two amplitudes $A_0$ and $A_1$ (corresponding to the heights of the primary peak and a secondary peak in the pattern of FIG. 5E). FIG. 5G shows the variation of amplitude $A_2$ (the height of a further secondary peak in the pattern of FIG. 5E) with $\Delta z$. FIG. 5H shows the variation of amplitude $A_3$ (the intensity value in a particular trough in the pattern of FIG. 5E) with $\Delta z$.

The various amplitude metrics presented are normalised to the corresponding amplitude at $\Delta z=0$.

Other metrics could also be used to characterise the shapes of the curves in the interference patterns and provide a measure of deformation-induced changes to the interference patterns. Where the interference pattern has a large amount of structure (e.g. the pattern of FIG. 5E in comparison to that of FIGS. 5A and 5C), in which case it may sometimes also be referred to as a 'speckle pattern', it may be appropriate to use more complex and/or numerous metrics to characterize the pattern. This may be more complicated to implement but may also yield more accurate and/or detailed information about the nature of the deformation of the cantilever.

More generally, metrics of the kind described in the examples above represent simple algorithms that can be incorporated into software to independently determine average cantilever tilt and curvature.

Embodiments of the present invention can be applied to atomic force microscopes, systems for detecting the presence or absence of a target substance in a fluid (e.g. biosensors), temperature sensors and pressure sensors.

For example, an atomic force microscope may be provided having a cantilever tethered at one end to the tip of a probe and configured to deform as a function of the separation between the tip of the probe and a sample (due to the "tip sample interaction"). An apparatus according to one or more of the embodiments discussed above could conveniently be used to measure the deformation and thereby determine the separation between the tip and sample. Alternatively or additionally, determination of the deformation may yield other useful information about the tip environment.

A system for detecting the presence or absence of a target substance in a fluid may be provided, in which a cantilever is deployed so as to be in contact with the fluid and to deform as a function of the presence or absence of the target substance. An apparatus according to one or more of the embodiments discussed above could conveniently be used to measure (detect) any deformation of the cantilever to thereby detect the presence or absence of the target substance. A plurality of such cantilevers could be deployed to detect the presence or absence of a range of different target substances. The same measurement system could be applied to simultaneously measure the distortions of all or a subset of the cantilevers. Alternatively or additionally, more than one measurement system may be provided.

A temperature sensor may be provided comprising a cantilever which is configured to deform as a function of its temperature. An apparatus according to one or more of the embodiments discussed above could conveniently be used to measure the deformation of the cantilever and thereby determine the temperature of the cantilever. Such a system would also be effective for determining the temperature of an environment and/or neighbouring object(s) with which the cantilever is in thermal equilibrium.

A pressure sensor may be provided comprising a cantilever which is configured to deform as a function of a pressure gradient in a fluid (or fluids) surrounding at least a portion of the cantilever. The pressure gradient may be at the edge of a fluid conduit or within a fluid, for example. An apparatus according to one or more of the embodiments discussed above could conveniently be used to measure the deformation of the cantilever and thereby measure the pressure gradient or pressure gradients to which the cantilever is subject.

The invention claimed is:

1. An apparatus for measuring deformation of a deformable portion of a tethered or untethered cantilever, comprising:
    a projection system for projecting a radiation beam onto a cantilever; and
    a measurement system for detecting radiation transmitted through or reflected from said cantilever, wherein
    said projection system is arranged such that the radiation diffracted by transmission through or reflection from the deformable portion of said cantilever forms an interference pattern without an additional reference beam reflected from or transmitted through a reference surface;
    said measurement system is configured to measure the spatial variation in intensity within at least a portion of said interference pattern; and
    said apparatus further comprises a deformation calculating system for calculating a deformation of said cantilever from the spatial variation in intensity measured by said measurement system, wherein the deformation calculated from said spatial variation in intensity consists of a change in shape of the deformable portion of the cantilever through or from which the radiation forming said interference pattern is transmitted or reflected.

2. An apparatus according to claim 1, wherein at least a portion of said interference pattern is formed as a result of a transmissive or reflective micropattern formed in or on said cantilever.

3. An apparatus according to claim 2, wherein said micropattern comprises at least one of the following: a regular or irregular array of reflective or transmissive slits; a regular or irregular array of transmissive or reflective spots; a two-dimensional array.

4. An apparatus according to claim 2, wherein said micropattern comprises identity information for identifying individual cantilevers, and said apparatus further comprises a cantilever identification device configured to determine the identity of said cantilever by reading the identity information contained in said micropattern.

5. An apparatus according to claim 4, wherein said identification device is configured to read said identity information from the interference pattern measured by said measurement system.

6. An apparatus according to claim 1, wherein the cantilever is freely suspended and/or travelling through a fluid, vacuum or a gas.

7. An apparatus according to claim 1, wherein, where said cantilever is formed from a strip of material of arbitrary shape, the projection system is configured to illuminate the cantilever with a coherent beam of radiation that spans the entire width of the cantilever, for at least a portion of the cantilever.

8. An apparatus according to claim 1, wherein the projection system is configured to illuminate the whole cantilever with a coherent beam of radiation.

9. An apparatus according to claim 1, wherein the projection system is configured to project a plurality of beams onto said cantilever, said interference pattern being formed from said plurality of beams.

10. An apparatus according to claim 1, wherein said deformation calculating system is configured to calculate a deformation based on one or more of the following characteristics of the measured spatial variation in intensity:
    (i) the shape of at least one intensity peak or intensity trough;
    (ii) the width of at least one intensity peak or intensity trough; and
    (iii) intensity values at identifiable positions in the interference pattern, including at least one of a maximum intensity value of an nth order peak, and a minimum intensity value between an nth and an (n+1)th order peak, where n is any integer.

11. An atomic force microscope, comprising:
    a cantilever tethered at one end to the tip of a probe and configured to deform as a function of the separation between the tip of the probe and a sample; and
    an apparatus for measuring the deformation of the cantilever according to claim 1 to determine the deflection of the tip because of tip sample interaction.

12. A system for detecting the presence or absence of a target substance in a fluid, comprising:
    a cantilever in contact with the fluid and configured to deform as a function of the presence or absence of said target substance; and
    an apparatus for measuring the deformation of the cantilever according to claim 1 to determine the presence or absence of said target substance.

13. A temperature sensor, comprising:
    a cantilever configured to deform as a function of its temperature; and
    an apparatus for measuring the deformation of the cantilever according to claim 1 to determine the temperature of the cantilever.

14. A pressure sensor, comprising:
    a cantilever configured to deform as a function of a pressure gradient, either at the edge of a fluid conduit or within a fluid; and
    an apparatus for measuring the deformation of the cantilever according to claim 1 to determine said pressure gradient.

15. A method of measuring deformation of a deformable portion of a tethered or untethered cantilever, comprising:
    projecting a radiation beam onto a cantilever; and
    detecting radiation diffracted by transmission through or reflection from said cantilever, wherein:
    said radiation beam is projected onto said cantilever in such a way as to form an interference pattern in said transmitted or reflected radiation without an additional reference beam reflected from or transmitted through a reference surface;
    and said method further comprises:
    measuring the spatial variation in intensity within at least a portion of said interference pattern; and
    calculating a deformation of said cantilever from the measured spatial variation in intensity, wherein the deformation calculated from said spatial variation in intensity consists of a change in shape of the deformable portion of the cantilever through or from which the radiation forming said interference pattern is transmitted or reflected.

16. A method according to claim 15, wherein said interference pattern is formed as a result of a transmissive or reflective micropattern formed in or on said cantilever.

17. A method according to claim 15, wherein said micropattern comprises identity information for identifying individual cantilevers, and said method further comprises determining the identity of said cantilever by reading the identity information contained in said micropattern.

18. A method according to claim 17, wherein said identity information is read from the measured interference pattern.

19. A method according to claim 15, further comprising providing said cantilever freely suspended and/or travelling in a fluid, vacuum or a gas.

20. A method according to claim 15, further comprising providing said cantilever tethered at one end to a substrate.

21. A method according to claim 15, further comprising projecting a plurality of beams onto said cantilever, said interference pattern being formed from said plurality of beams.

22. A method according to claim 15, wherein, where said cantilever is formed from a strip of material of arbitrary shape, further comprising illuminating the cantilever with a coherent beam of radiation that spans the entire width of the cantilever, for at least a portion of the cantilever.

* * * * *